United States Patent Office 2,704,463
Patented Mar. 22, 1955

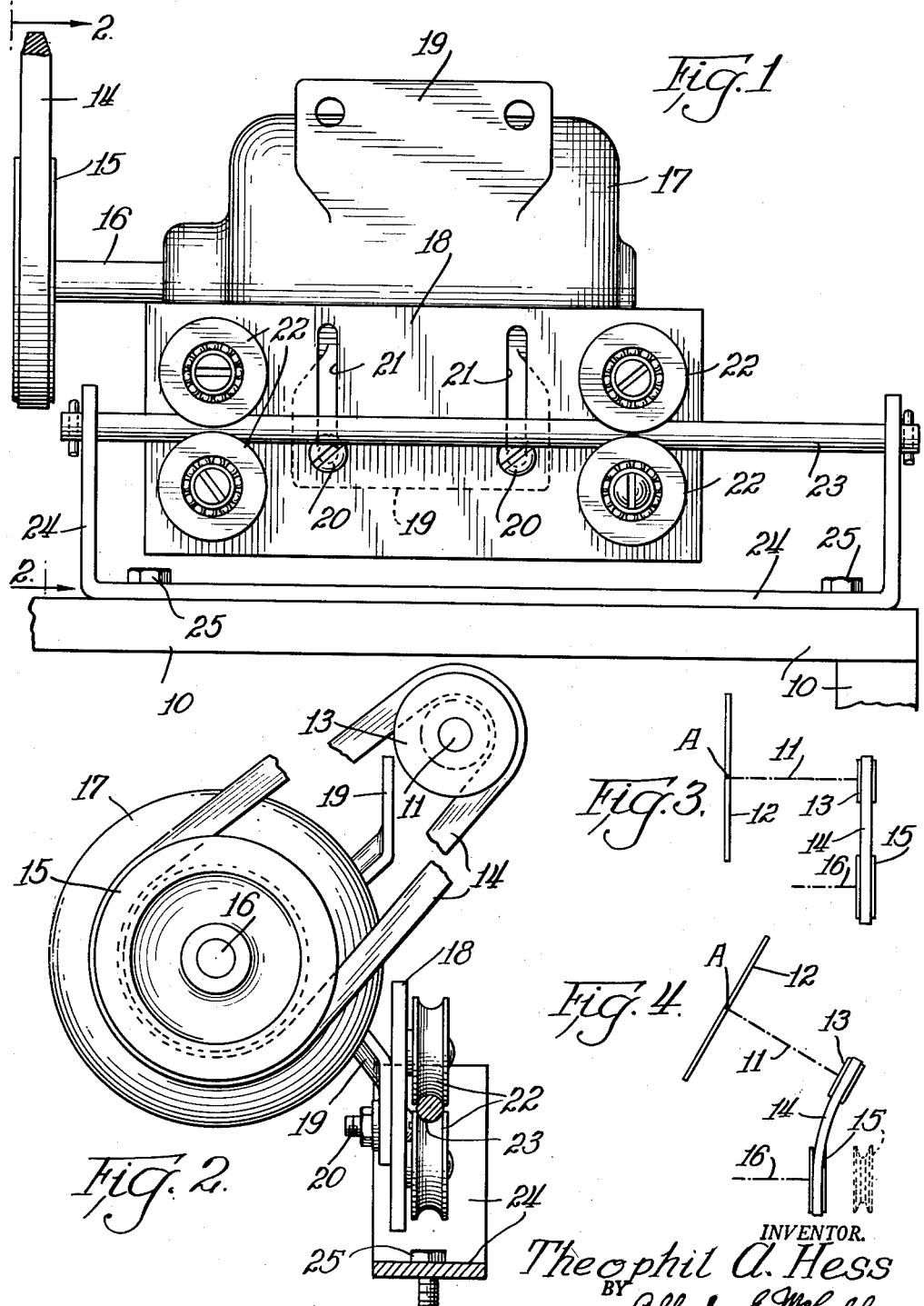

2,704,463

DRIVING MEANS FOR TILTABLE ARBORS AND THE LIKE

Theophil A. Hess, Chicago, Ill., assignor to Duro Metal Products Co., Chicago, Ill., a corporation of Illinois Application December 6, 1950, Serial No. 199,407

1 Claim. (Cl. 74—219)

This invention relates to driving means for use on power driven machines of a type employing a tiltable arbor supporting a saw blade or other tool for movement to adjusted angular positions with respect to the frame or work supporting parts of the machine, and relative to a motor by which power is supplied for operating the tool. It has for a general object the provision of an improved construction of means for effecting the transfer of power from a motor to a tool through an endless belt which is twisted from a plane of normal operation as a driven arbor is adjusted angularly with respect to the shaft axis of a driving motor.

In machines of the aforementioned type, in which an endless belt and pulleys are used for driving one shaft or arbor from another, with the driven shaft or arbor by which a tool is carried mounted to tilt to adjusted positions out of axial parallelism with respect to the driving shaft or arbor for changing the angular position of the tool, the tilting movement of such arbor is ordinarily about an axis passing through the tool at a substantial distance to one side of the pulley on the driven arbor. Under these circumstances, when the driven arbor is adjusted angularly away from parallelism with the driving shaft, the pulley on the driven arbor is moved through an arcuate path transverse to the line of the driving belt, so that both the alignment and spacing of the driving and driven pulleys are changed. The structure of my disclosed driving means not only contemplates the provision of a secure and effective mounting for a prime mover which carries the driving pulley, but one which allows the prime mover to shift axially of the driving pulley and arcuately toward and from the driven pulley in response to the direction and value of belt tension, thereby to compensate for angular and linear components of driven pulley movement, as well as the relative spacing between the driving and driven pulleys.

Other objects and advantages of the invention will be apparent from the following description and the accompanying drawings in which similar characters of reference indicate similar parts throughout the several views.

In the single sheet of drawings:

Fig. 1 is a side elevational view of a motor and motor mounting adapted to use in a belt driven machine and embodying a preferred form of my invention;

Fig. 2 is an end view of the parts as observed from the left in Fig. 1; and

Figs. 3 and 4 are diagrammatic side views illustrating a type of belt driven mechanism including a tool and its driving means and depicting an illustrative adaptation of the motor and mounting shown structurally in Figs. 1 and 2.

Referring now to the several figures of the drawing, 10 indicates the frame of a power tool such as a table saw which embodies a shaft or arbor 11, having a circular saw 12 mounted thereon, as shown in Figs. 3 and 4; such arbor 11 being supported for rotation and mounted on the frame so as to be tiltable in an axial plane about an axis A passing through the saw, as shown in Figs. 3 and 4. The means for mounting the arbor 11 for tilting movement to adjusted positions about an axis passing through the plane of the saw and the axis of the arbor may be of the type illustrated in my application, Serial No. 194,149, filed on November 4, 1950, now Patent No. 2,626,639, or may be of any other suitable type.

In the illustrated structure, the arbor 11 has secured thereto, at a distance from the saw 12, a grooved pulley 13 which is connected by an endless belt 14 with a grooved pulley 15 on the end of an arbor 16 which constitutes the drive shaft of an electric motor 17. As shown in Figs. 1 and 2, the motor 17 is mounted through the medium of a supporting plate 18 to which the motor is fixedly and adjustably secured through a bracket 19. As shown in Fig. 1, the bracket is secured to the plate 18 by bolts 20, extending through slots 21 in the plate. This plate 18 is supported for swinging and linear movements on the frame 10 by two sets of grooved ball bearing rollers 22, rotatably mounted on the plate at opposite end portions thereof; such rollers being in positions to engage opposite face portions of a round bar 23 fixedly mounted on the frame 10 by a yoke 24 which is secured to the frame by machine screws 25.

With the arbor 11 in a position of parallelism to the motor shaft 16, as shown in Fig. 3, the pulleys 13 and 15 are aligned and the belt 14 is effective for driving the pulley 13 and the arbor 11 for rotating the saw blade 12. When the arbor 11 is tilted out of its position of parallelism to the motor shaft 16 and into an angular position with respect to the frame, as shown in Fig. 4, in which the saw blade 12 stands in angled position with respect to its associated work table, the driving pulley 15 on the motor shaft is caused to move with the motor toward the left, as viewed in Fig. 4, as a result of the axial component of the arcuate movement of the driven pulley 13 and the accompanying transverse pull of the endless belt 14 on the driving pulley; the endless belt being kept at all times in an effectively aligned driving position with respect to the driven pulley 13.

In addition to providing for linear movement of the motor and driving pulley along the bar 23, it may be observed that the bar is round in cross section and the rollers 22 are arcuately grooved, so that the motor can swing about the axis of the bar. Additionally, the bar is so placed in reference to the axes of the driving and driven pulleys that a component of the weight of the motor is supported by the belt; thereby serving to tension the belt. In the disclosed structure, the motor is mounted at the side of the bar 23 away from the driven pulley, whereby variation of the distance between the driving and driven pulleys, resulting from adjustment of the position of the arbor 11, is taken up by movement of the motor about the axis of bar 23.

With the disclosed structure, the opposed and arcuately grooved rollers not only allow free movement of the motor axially of the bar 23 and permit movements of the motor about the axis of the bar to tension the belt, but those rollers by virtue of their opposed positions relative to the bar, grip the bar so as to secure the motor to its mounting support.

While I have illustrated a preferred embodiment of my invention, many modifications may be made without departing from the spirit of the invention, and I do not wish to be limited to the precise details of construction set forth, except so far as the same may be specifically claimed, but I desire rather, to avail myself of all changes within the scope of the appended claim.

Having thus described my invention, what I claim as new and desire to cover by Letters Patent of the United States, is:

In a belt driven power operated machine, the combination comprising a tool supporting arbor supported for rotation and having a tool mounted thereon to be driven thereby, said tool supporting arbor being angularly adjustable in a single plane to a plurality of positions, a driven pulley secured to the arbor at a position spaced from said tool, a motor having a drive shaft with a driving pulley secured thereto, means for supporting the motor for relatively free movement longitudinally of the drive shaft and with the axis of the drive shaft substantially parallel to said plane so that movements of the motor will follow movements of the driven pulley when the arbor is adjusted, and a belt providing a driving connection between the driving and driven pulleys, said means for supporting the motor including a fixed bar of circular section substantially parallel to the drive shaft, a base plate on the motor, rollers mounted on the base plate for rotation in a plane parallel to the base plate and at positions for receiving the bar between opposed peripheral roller surfaces, and the peripheral surfaces of said rollers being grooved so that the rollers effectively grip the bar while providing a support for movement of the motor along the bar.

References Cited in the file of this patent

UNITED STATES PATENTS

| | | |
|---|---|---|
| 1,440,721 | Di Carlo | Jan. 2, 1923 |
| 2,102,560 | Kimmich | Dec. 14, 1937 |
| 2,323,247 | Sellmeyer | June 29, 1943 |
| 2,471,773 | Pollak | May 31, 1949 |
| 2,530,290 | Collins | Nov. 14, 1950 |
| 2,547,940 | Hearn | Apr. 10, 1951 |